US010055355B1

(12) United States Patent
Ambroladze et al.

(10) Patent No.: US 10,055,355 B1
(45) Date of Patent: Aug. 21, 2018

(54) NON-DISRUPTIVE CLEARING OF VARYING ADDRESS RANGES FROM CACHE

(71) Applicant: International Business Machines Corporation, Armonk, NY (US)

(72) Inventors: Ekaterina M. Ambroladze, Dutchess, CA (US); Deanna P. D. Berger, Hyde Park, NY (US); Michael A. Blake, Wappingers Falls, NY (US); Pak-Kin Mak, Poughkeepsie, NY (US); Robert J. Sonnelitter, III, Wappingers Falls, NY (US); Guy G. Tracy, Austin, TX (US); Chad G. Wilson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/716,713

(22) Filed: Sep. 27, 2017

Related U.S. Application Data

(63) Continuation of application No. 15/491,149, filed on Apr. 19, 2017.

(51) Int. Cl.
  *G06F 12/08* (2016.01)
  *G06F 12/0891* (2016.01)
  *G06F 12/0804* (2016.01)

(52) U.S. Cl.
  CPC ...... *G06F 12/0891* (2013.01); *G06F 12/0804* (2013.01); *G06F 2212/60* (2013.01)

(58) Field of Classification Search
  CPC .......................... G06F 12/0891; G06F 12/0804
  USPC ........................................................ 711/135
  See application file for complete search history.

(56) References Cited

U.S. PATENT DOCUMENTS

| 5,410,668 | A  | 4/1995  | Hilton            |
|-----------|----|---------|-------------------|
| 8,055,960 | B2 | 11/2011 | Huott et al.      |
| 8,364,899 | B2 | 1/2013  | Ambroladze et al. |
| 8,452,942 | B2 | 5/2013  | Slegel et al.     |
| 8,806,179 | B2 | 8/2014  | Greiner et al.    |
| 9,507,660 | B2 | 11/2016 | Ambroladze et al. |

(Continued)

FOREIGN PATENT DOCUMENTS

| WO | 9510083       | 4/1995 |
|----|---------------|--------|
| WO | 2007081661 A3 | 7/2007 |

(Continued)

OTHER PUBLICATIONS

Ansari, et al., "Maximizing Spare Utilization by Virtually Reorganizing Faulty Cache Lines", IEEE Transactions on computers, vol. 60, No. 1, Jan. 2011, Copyright 2011, pp. 35-49.

(Continued)

*Primary Examiner* — Than Nguyen
(74) *Attorney, Agent, or Firm* — Stephanie L. Carusillo

(57) ABSTRACT

In an approach for purging an address range from a cache, a processor quiesces a computing system. Cache logic issues a command to purge a section of a cache to higher level memory, wherein the command comprises a starting storage address and a range of storage addresses to be purged. Responsive to each cache of the computing system activating the command, cache logic ends the quiesce of the computing system. Subsequent to ending the quiesce of the computing system, Cache logic purges storage addresses from the cache, based on the command, to the higher level memory.

1 Claim, 5 Drawing Sheets

(56) References Cited

U.S. PATENT DOCUMENTS

| | | |
|---|---|---|
| 2002/0087765 A1 | 7/2002 | Kumar et al. |
| 2005/0283657 A1 | 12/2005 | Nishihara |
| 2008/0163014 A1 | 7/2008 | Crawford et al. |
| 2009/0070532 A1 | 3/2009 | Bussa et al. |
| 2009/0077425 A1 | 3/2009 | Gschwind et al. |
| 2009/0182953 A1 | 7/2009 | Merkey et al. |
| 2009/0204762 A1 | 8/2009 | Huott et al. |
| 2009/0210629 A1* | 8/2009 | Blake ............ G06F 12/0817 711/135 |
| 2009/0300413 A1 | 12/2009 | Chang et al. |
| 2010/0088550 A1 | 4/2010 | Imai et al. |
| 2011/0320732 A1* | 12/2011 | Ambroladze ......... G06F 12/126 711/135 |
| 2012/0204010 A1 | 8/2012 | Greiner et al. |
| 2013/0097369 A1* | 4/2013 | Talagala ............ G06F 12/0246 711/103 |
| 2013/0145216 A1 | 6/2013 | Eggers et al. |
| 2013/0179740 A1 | 7/2013 | Jeddeloh |
| 2013/0339785 A1 | 12/2013 | Ambroladze et al. |
| 2014/0006849 A1 | 1/2014 | Ramirez et al. |
| 2014/0095926 A1 | 4/2014 | Ambroladze et al. |
| 2015/0039938 A1 | 2/2015 | Sivaramakrishnan et al. |
| 2016/0004587 A1 | 1/2016 | Agrawal et al. |
| 2016/0232052 A1 | 8/2016 | Ambroladze et al. |
| 2016/0232067 A1 | 8/2016 | Ambroladze et al. |
| 2016/0364312 A1 | 12/2016 | Ambroladze et al. |
| 2017/0017577 A1 | 1/2017 | Siegel et al. |

FOREIGN PATENT DOCUMENTS

| | | |
|---|---|---|
| WO | 2008106095 A1 | 9/2008 |
| WO | 2009124320 A1 | 10/2009 |

OTHER PUBLICATIONS

Roberts, David Andrew, "Efficient Data Center Architectures Using Non-Volatile Memory and Reliability Techniques", A dissertation submitted in partial fulfillment of the requirements for the degree of Doctor of Philosophy in The University of Michigan, 2011, 170 pgs.

Ambroladze et al., "Non-Disruptive Clearing of Varying Address Ranges From Cache", U.S. Appl. No. 15/491,149, filed Apr. 19, 2017, 23 pages.

IBM, "List of IBM Patent Applications Treated as Related", Appendix P, Dated Sep. 27, 2017, 2 pages.

* cited by examiner

NON-DISRUPTIVE CLEARING OF VARYING ADDRESS RANGES FROM CACHE

BACKGROUND

The present invention relates generally to the field of clearing a cache, and more particularly to non-disruptive clearing of varying address ranges from a cache.

A cache is a component that transparently retains data elements (or simply data) so that future requests for any retained data can be served faster. A data element that is stored within a cache corresponds to a pre-defined storage location within a computer memory system. Such a data element might be a value that has recently been computed or a duplicate copy of the same data element that is also stored elsewhere.

When multiple images are stored in computer systems, it is highly desirable to dynamically reallocate storage among the multiple images in order to increase storage sizes for images which need improved throughput. Therefore, it is necessary to clear cache entries which correspond to respective storage addresses being reallocated from existing images and into critical images. Typically, the storage addresses being reallocated include a large contiguous range of storage addresses. The clearing of cache entries containing storage addresses being reallocated requires a full quiesce of the system, therefore, it needs to be performed quickly to minimize any impact on the system performance.

Many system state changes, such as data storage reallocation, require a conventional quiesce to pause all processors in the system. One processor requests quiesce of the system, which means that all processors need to pause what they are doing and indicate that they will pause all operations until further notice. Once all processors pause and respond, the system state change can occur. Once completed, the requesting processor will send a "reset quiesce" broadcast to all processors to resume their operations.

SUMMARY

Aspects of an embodiment of the present invention disclose a method, computer program product, and computer system for purging an address range from a cache. A processor quiesces a computing system. Cache logic issues a command to purge a section of a cache to higher level memory, wherein the command comprises a starting storage address and a range of storage addresses to be purged. Responsive to each cache of the computing system activating the command, cache logic ends the quiesce of the computing system. Subsequent to ending the quiesce of the computing system, cache logic purges storage addresses from the cache, based on the command, to the higher level memory.

DETAILED DESCRIPTION

Embodiments of the present invention recognize the importance of system responsiveness during data storage invalidation and reallocation. Data storage reallocation takes storage from a lower level cache to a higher level cache. However, the conventional way to complete data storage reallocation takes long and requires a full quiesce of a system. A full quiesce of the system is required during a purge and millicode needs to send in multiple select purges to the system in order to invalidate large sections of storage. This full quiesce of the system during select purges requires the system to be in quiesce for milliseconds. Also, a selective purge only has a maximum range of 16 GB. Thus, there is a need for an approach that allows for selective purging of cache entries that does not require a full quiesce of a system. Embodiments of the present invention provide a non-disruptive clearing of varying address ranges from cache. Embodiments of the present invention also provide an increase in the selective purge maximum range greater than 16 GB. In this manner, as discussed in greater detail herein, embodiments of the present invention involve quiescing a system only while setting up a selective purge and then completing a non-disruptive selective purge.

The present invention will now be described in detail with reference to the Figures.

Figure 1:
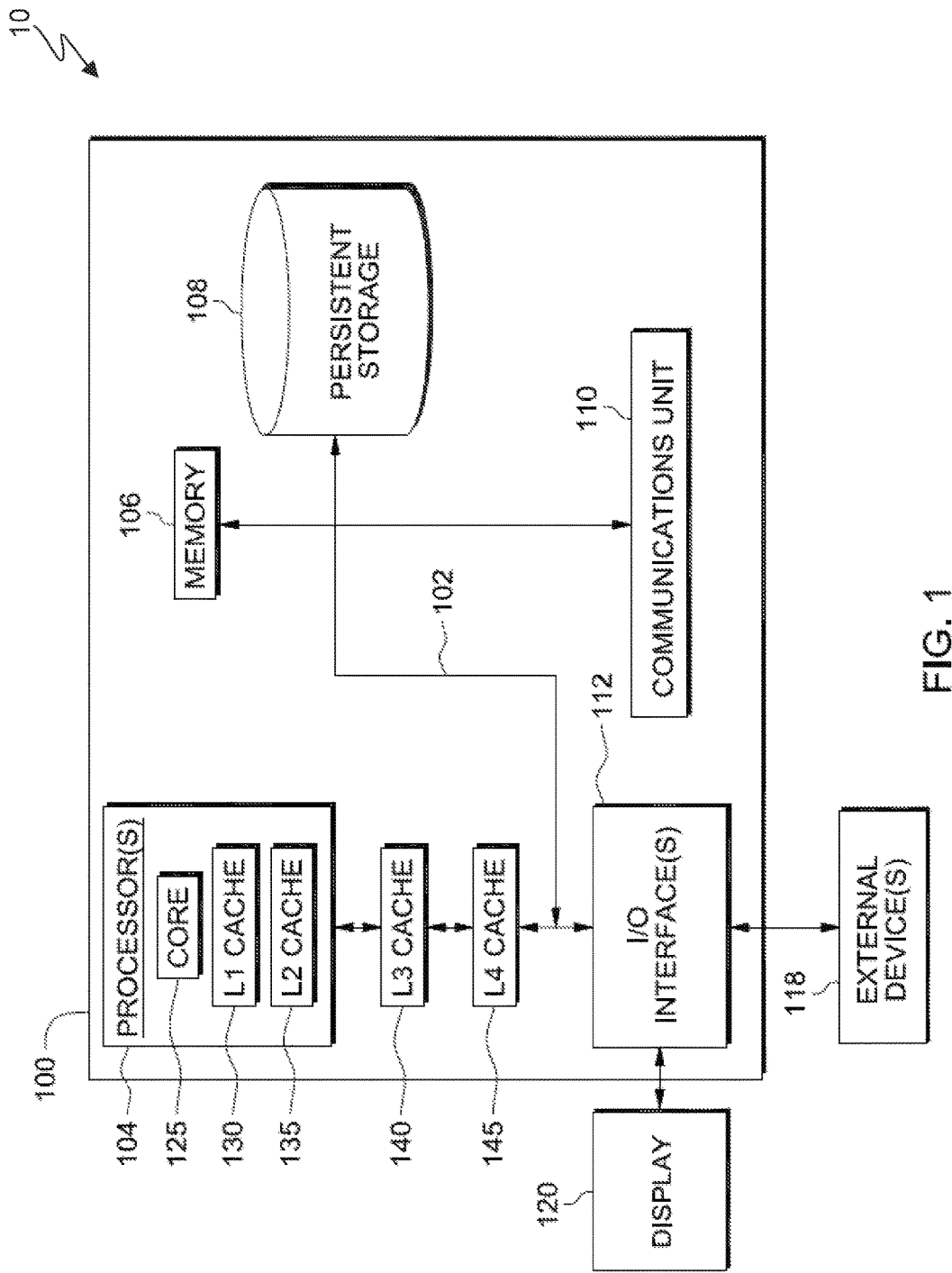
FIG. 1 depicts a functional block diagram illustrating a data processing environment, in accordance with an embodiment of the present invention.

FIG. 1 is a functional block diagram illustrating a distributed data processing environment, generally designated 10, in accordance with one embodiment of the present invention. FIG. 1 depicts a block diagram of components of computing device 100, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Computing device 100 may be a management server, a web server, or any other electronic device or computing system capable of receiving and sending data, and processing program instructions. In some embodiments, computing device 100 may be a laptop computer, tablet computer, netbook computer, personal computer (PC), a desktop computer, or any programmable electronic device.

Computing device 100 includes communications fabric 102, which provides communications between core 125, cache (e.g., L1 cache 130, L2 cache 135, L3 cache 140, L4 cache 145), memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses or a crossbar switch.

Processor 104 may be a processor with one or more cores (e.g., core 125). In the depicted embodiment, processor 104 includes core 125, L1 cache 130, and L2 cache 135. Processor 104 may include any number of cache levels. Core 125 is an individual central processing unit (CPU) located on processor 104. In embodiments of the present invention, there may be any number of cores 125 within processor 104.

Memory 106 and persistent storage 108 are computer readable storage media. In this embodiment, memory 106 includes random access memory (RAM). In general, memory 106 can include any suitable volatile or non-volatile computer readable storage media.

Figure 2:
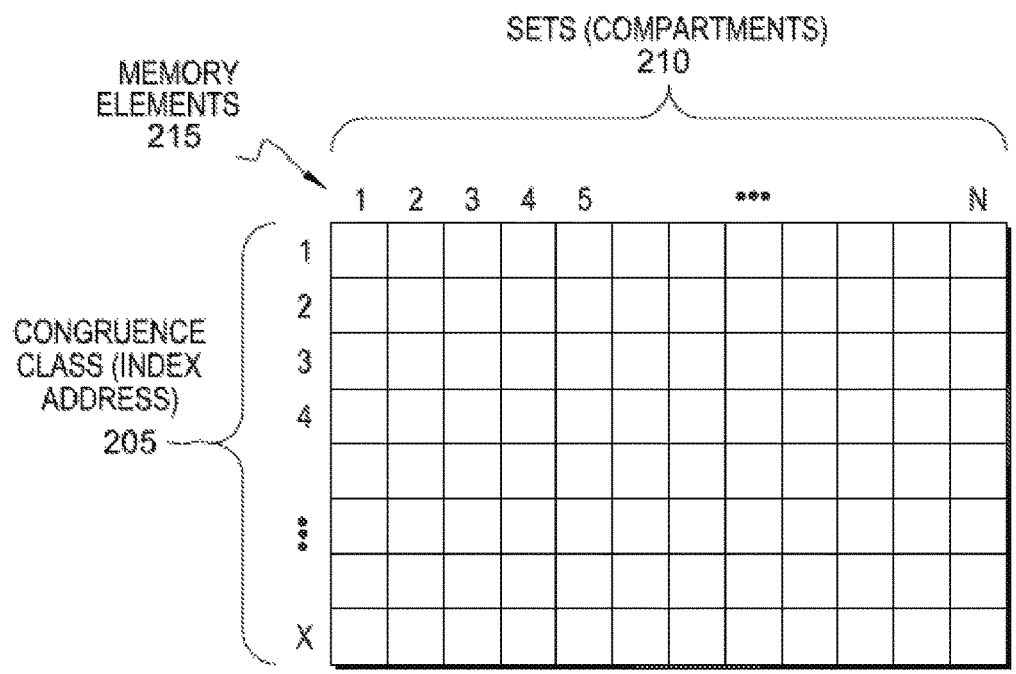
FIG. 2 depicts additional details of the caches, in accordance with an embodiment of the present invention.
Figure 2:
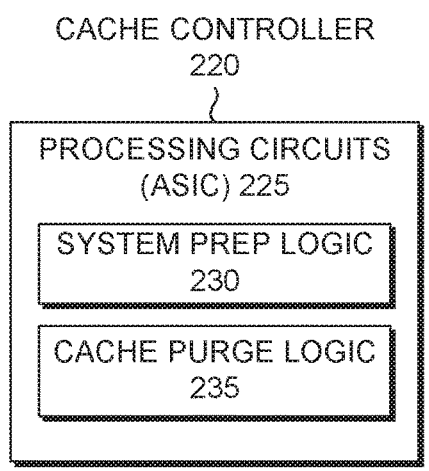

Cache (e.g., L1 cache 130, L2 cache 135, L3 cache 140, L4 cache 145) is a fast memory that enhances the performance of computer processor(s) 104 by holding recently accessed data, and data near accessed data, from memory 106. In the depicted embodiment, L1 cache 130 and L2 cache 135 are located on processor 104. In the depicted embodiment, L1 cache 130 and L2 cache 135 are on-processor memory for caching data on processor 104. Processor 104 may be operatively connected to L3 cache 140, which in turn may be operatively connected to L4 cache 145. Data retrieved from memory 106 may be cached in any of the caches (e.g., L1 cache 130, L2 cache 135, L3 cache 140, L4 cache 145). Typically, the cache size increases as the cache level increases while the speed at which data can be accessed decreases as the cache level increases, primarily because lower level caches are located close to core 125 and/or processor 104. In the depicted embodiment, for example, L1 cache 130 is the smallest size cache and is the closest cache to core 125, while L4 cache 145 is the largest size cache and is the furthest away cache from core 125. While the depicted embodiment includes L1 cache 130, L2 cache 135, L3 cache 140, and L4 cache 145, it should be understood that different cache arrangements, in both number of cache levels and location within the system, are recognized by embodiments of the present invention. Further, it is recognized that some cache levels may be dedicated to core 125, while other cache levels are shared between core 125 and additional cores (not shown) of processor 104. FIG. 2 illustrates further details of L1 cache 130, L2 cache 135, L3 cache 140, and/or L4 cache 145, in accordance with an embodiment of the present invention.

Programs may be stored in persistent storage 108 and in memory 106 for execution by one or more of the respective computer processors 104 via L1 cache 130, L2 cache 135, L3 cache 140, and/or L4 cache 145. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Programs may be downloaded to persistent storage 108 through communications unit 110.

I/O interface(s) 112 allows for input and output of data with other devices that may be connected to computing device 100. For example, I/O interface 112 may provide a connection to external devices 118 such as a keyboard, keypad, a touch screen, and/or some other suitable input device. External device(s) 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 108 via I/O interface(s) 112. I/O interface(s) 112 also connect to a display 120.

Display 120 provides a mechanism to display data to a user and may be, for example, a computer monitor.

FIG. 2 illustrates further details of L1 cache 130, L2 cache 135, L3 cache 140, and/or L4 cache 145, in accordance with one embodiment of the present invention. As discussed herein, reference is made to L3 cache 140. However, the explanation may apply to L1 cache 130, L2 cache 135, and L4 cache 145, in embodiments of the invention.

L3 cache 140 (along with L1 cache 130, L2 cache 135, and L4 cache 145) may be an N-way set associative cache with 1-X congruence classes 205 (shown as rows) and 1-N sets (shown as columns) as understood by one skilled in the art. As discussed herein, each congruence class can also be referred to as an addressable index (or index) 205, and each set 210 can be referred to as a compartment.

In the depicted example, L3 cache 140 is a twelve-way set associative cache. There may be fewer or additional sets 210 in the cache. Twelve sets are used for explanation purposes.

L3 cache 140 has numerous memory elements 215, each of which stores data. The memory elements 215 also referred to as memory cells are integrated circuits for storing data. L3 cache 140 also includes a cache controller 220 that controls loading (writing), evicting, and reading (requesting) data in the memory elements 215 of the L3 cache 140. L3 cache 140 includes cache directory 520 (see FIG. 5) which maintains the state of each set (compartment) 210 and other applicable information on the data, such as an address. Cache controller 220 controls and makes updates to cache directory 520 as well as memory elements 215.

Cache directory 520 may have, for example, a grid of status indications, where each individual status indication represents a corresponding memory element 215 in the cache (e.g., L1 cache 130, L2 cache 135, L3 cache 140, L4 cache 145). Each set (compartment) 210 has corresponding bits that indicate the status: valid, invalid, empty, owned, offline, not to be used (i.e., killed), etc. Further, cache directory 520 may indicate various sections within the cache. Such sections may be specified by a bit, and may include compartments from multiple indexes 205.

Cache controller 220 may include processing circuits 225 which may be application specific integrated circuits (ASIC) and various state machines (not shown). A state machine (e.g., finite-state machine (FSM) or finite-state automaton) reads a series of inputs. When the state machine reads an input it will switch to a different state. Each state specifies which state to switch for a given input.

For example, a state machine is a mathematical model used to design computer programs and digital logic circuits. A state machine can be in one of a finite number of states. A state machine is only one state at a time, and the state the state machine is in at any given time is called the current state. The state can change from one state to another when initiated by a triggering event or condition, and this is called a transition. Each particular state machine is defined by a list of the possible transition states from each current state and by the triggering condition for each transition.

Various state machines have different roles that the various state machines are designed to fulfill. Various state machines may be used by a transaction or operation to access data stored in memory elements 215. Various state machines can access memory elements 215 (i.e., access the cache) for processor 104 (e.g., core 125, an application in memory 106).

For each set (compartment) 210, cache directory 520 contains information about the status indication of the corresponding memory element 215. Each of the directory statuses for sets 1-N in a specific congruence class 205 are read out each time a state machine or logic (e.g., hardware logic, software logic) accesses L3 cache 140. In one embodiment, each of the directory statuses for a section of L3 cache 140 are read out each time a state machine or logic accesses the section of L3 cache 140.

Cache controller 220 includes system prep logic 230. System prep logic 230 operates to temporarily quiesce computing device 100 while setting up cache purge logic 235 to prevent window conditions with different drawers from starting the selective purge sequence at different times. System prep logic 230 also operates to initiate cache purge logic 235. System prep logic 230 may be hardware or software logic. In some embodiments, system prep logic 230 is executed by cache controller 220 which can include various state machines and/or millicode that may be configured to perform the actions.

Cache controller 220 includes cache purge logic 235. Cache purge logic 235 operates to execute a selective purge sequence. In an embodiment, cache purge logic 235 includes a multiplier that can cover up to 1 TB of storage. The multiplier allows the number of storage increments provided in bits 56:59 of the selective purge address to be multiplied by 1, 16, or 64. This allows for a maximum selective purge range of 64×16 increments or 1 TB of storage. Adding the multiplier will not make the sequence take longer because the time to completion is a factor of cache size, not of the size of the address range requested to be purged. While the selective purge sequence is running, cache purge logic 235 runs an address comparison that compares a pipeline address from an operation to the selective purge storage address range. If the pipeline address is within the selective purge address range, then an "Invalid Address" response is reported until the selection purge sequence is completed. Cache purge logic 235 may be hardware or software logic. In some embodiments, cache purge logic 235 is executed by cache controller 220 which can include various state machines and/or millicode that may be configured to perform the actions.

Figure 3:
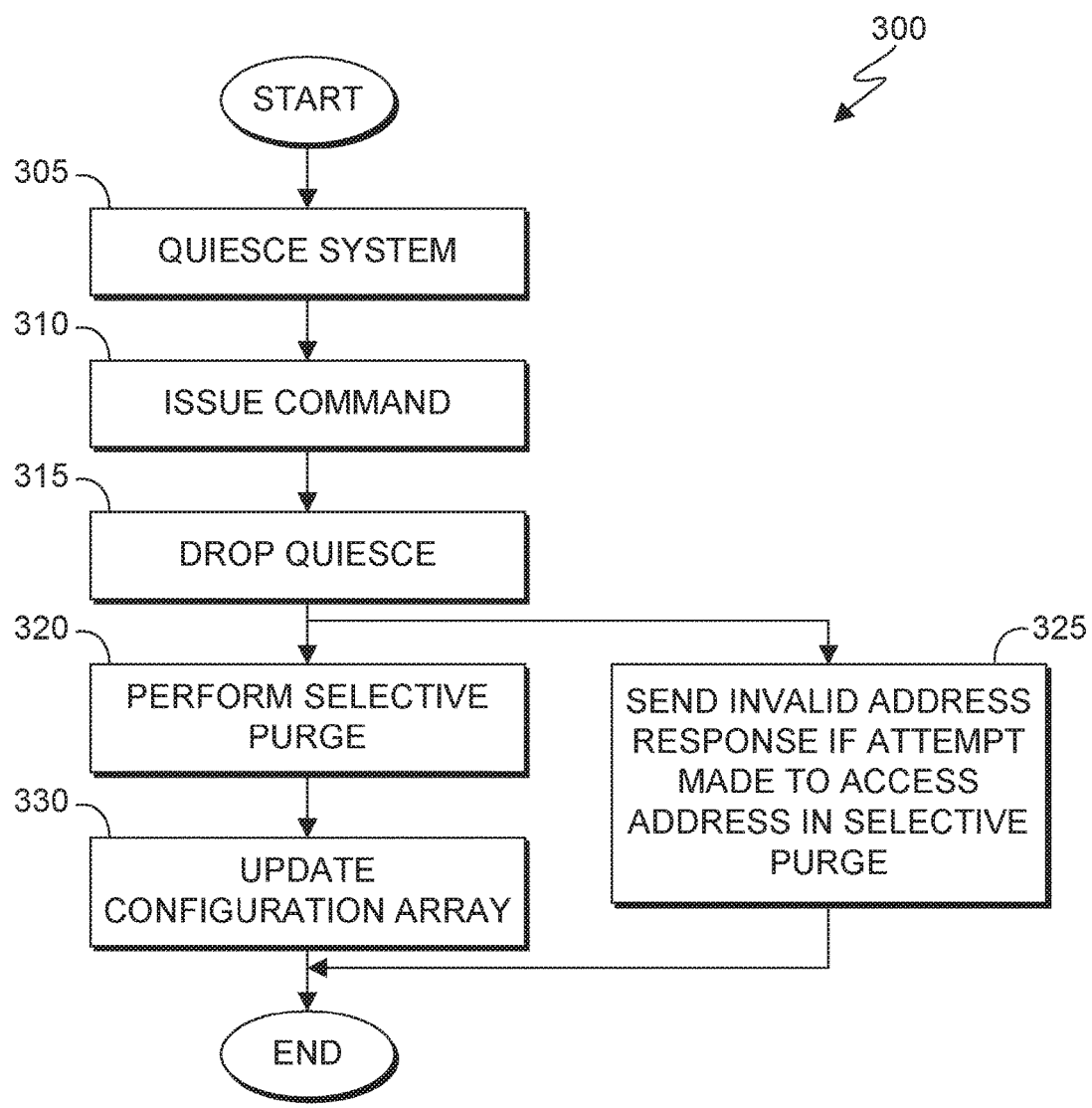
FIG. 3 is a flowchart depicting operational steps of a system prep logic and cache purge logic executing within the data processing environment of FIG. 1, in accordance with an embodiment of the present invention.

FIG. 3 depicts a flowchart 300 of the steps of system prep logic 230 and cache purge logic 235 executing within the data processing environment of FIG. 1, in accordance with an embodiment of the present invention. It should be appreciated that the process depicted in FIG. 3 illustrates one possible iteration of system prep logic 230 and cache purge logic 235, which can repeat every time a selective purge sequence is requested.

In step 305, system prep logic 230 quiesces a computing system, such as computing device 100. In an embodiment, system prep logic 230 quiesces all processors, such as processor 104, and holds all I/O communications, such as with I/O interface(s) 112. In an embodiment, system prep logic 230 quiesces a computing system in response to a request from a processor requesting a selective purge sequence.

In step 310, system prep logic 230 issues a command to enable an address comparison, to set a storage increment and multiplier, and to start cache purge logic 235. Instead of the traditional method of issuing three separate commands, system prep logic 230 issues a single command to accomplish these three tasks. In an embodiment, system prep logic 230 issues a command to enable an address comparison that determines if incoming pipeline operations are trying to access an address involved in the ongoing selective purge sequence. If the incoming pipeline operation is trying to access an address involved in the ongoing selective purge sequence, cache purge logic 235 responds back with an "Invalid Address" response (see step 325). In an embodiment, system prep logic 230 issues a command to set the storage address increment or length of the storage address range, which along with the starting address defines the storage address range to be purged. In an embodiment, system prep logic 230 issues a command to set a multiplier for the storage address range.

In step 315, once all the caches of the computing system, such as computing device 100, have seen or activated the commands (see step 310), system prep logic 230 drops the quiesce of processors and hold on all I/O communications. Once the quiesce and hold are dropped, cache purge logic 235 begins (see step 320).

In step 320, cache purge logic 235 performs the selective purge. In an embodiment, cache purge logic 235 steps through the caches and purges any lines that are within the storage address range indicated by the issued command out to memory.

In step 325, if an incoming pipeline operation tries to access an address involved in the ongoing selective purge sequence, cache purge logic 235 responds to the incoming pipeline operation with an "Invalid Address" response. In an embodiment, cache purge logic 235 compares the address trying to be accessed to the storage address range of the selective purge.

In step 330, cache purge logic 235 updates a configuration array with the new physical location of the purged data. Once cache purge logic 235 updates the configuration array, cache purge logic 235 ends by indicating the end of the selective purge sequence and issuing a command to drop the address comparison (see step 325).

Figure 4:
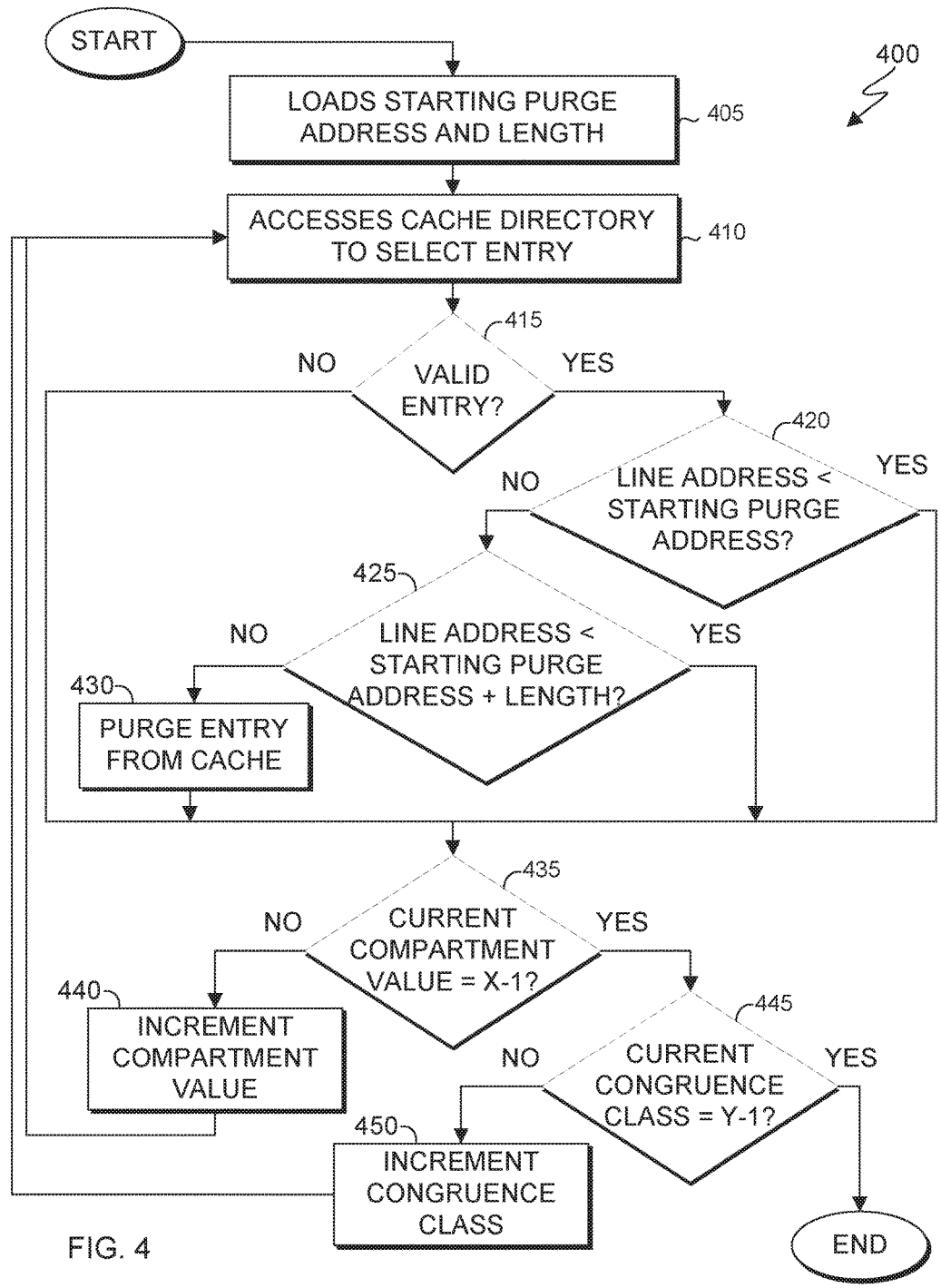
FIG. 4 depicts a flowchart of the detailed steps of the selective purge of cache purge logic executing within the data processing environment of FIG. 1, in accordance with an embodiment of the present invention.

FIG. 4 depicts a flowchart 400 of the detailed steps of the selective purge of step 320 of cache purge logic 235 executing within the data processing environment of FIG. 1, in accordance with an embodiment of the present invention. It should be appreciated that the process depicted in FIG. 4 illustrates one possible iteration of cache purge logic 235, which can repeat every time a selective purge is done.

In step 405, cache purge logic 235 loads a starting storage address and a length of the storage address range to be purged. In an embodiment, cache purge logic 235 determines preset values for a congruence class and compartment of cache directory 520 (see FIG. 5). In an exemplary embodiment, cache purge logic 235 sets the initial preset values for the congruence class and compartment to zero (0).

In step 410, cache purge logic 235 accesses cache directory 520 based on the preset value of the congruence class. In an embodiment, cache purge logic 235 selects an entry in cache directory 520 based on the preset value of the compartment.

In decision 415, cache purge logic 235 determines the validity of the selected entry by examining an ownership tag of the selected entry. If in decision 415 cache purge logic 235 determines that the selected entry is valid, then cache purge logic 235 moves on to decision 420. If in decision 415 cache purge logic 235 determines that the selected entry is not valid, then cache purge logic 235 moves on to decision 435.

In decision 420, cache purge logic 235 performs a comparison of a line address of the entry with the starting storage address. In an embodiment, the line address associated with the entry is created by appending the congruence class address bits with the address index address bits obtained from the entry. In an embodiment, cache purge logic 235 determines whether the line address of the entry is greater than or less than the starting storage address. If in decision 420 cache purge logic 235 determines the line address is greater than the starting storage address, then cache purge logic 235 moves on to decision 425. If in decision 420 cache purge logic 235 determines the line address is less than the starting storage address in decision 420, then cache purge logic 235 moves to decision 435.

In decision 425, cache purge logic 235 performs a comparison of the line address of the entry with a sum of the starting storage address and the length of the storage address range. In an embodiment, cache purge logic 235 determines whether the line address of the entry is greater than or less than the starting storage address. If in decision 425 cache purge logic 235 determines the line address is greater than the sum, then cache purge logic 235 moves on to step 430, where cache purge logic 235 purges the entry from cache directory 520 (see FIG. 5). If in decision 425 cache purge logic 235 determines the line address is less than the sum, then cache purge logic 235 moves to decision 435.

In decision 435, cache purge logic 235 determines whether the current compartment value is equal to a maximum value (X−1). If in decision 435 cache purge logic 235 determines that the current compartment is less than the maximum value (X−1), cache purge logic moves to step 440, in which the compartment is incremented via a compartment incrementor 505 (see FIG. 5), and cache purge logic 235 returns to step 410 where an entry is now accessed based upon the current compartment value as incremented and the congruence class value. In an embodiment, cache purge logic 235 repeats step 410 through decision 435 until the current compartment value is equal to the maximum value (X−1). If in decision 435 cache purge logic 235 determines that the current compartment value is equal to the maximum value (X−1), then cache purge logic 235 moves to decision 445.

In decision 445, cache purge logic 235 determines whether the current congruence class value is equal to a maximum value (Y−1). If in decision 445, cache purge logic 235 determines that the current class value is equal to the maximum value (Y−1), then cache purge logic 235 ends. If in decision 445 cache purge logic 235 determines that the current congruence class value is less than the maximum value (Y−1), then cache purge logic 235 increments the current congruence class value by one via a congruence class incrementor 510 (see FIG. 5) and cache purge logic 235 returns and repeats step 410 through decision 445, as necessary, until the congruence class value is equal to the maximum value (Y−1).

Figure 5:
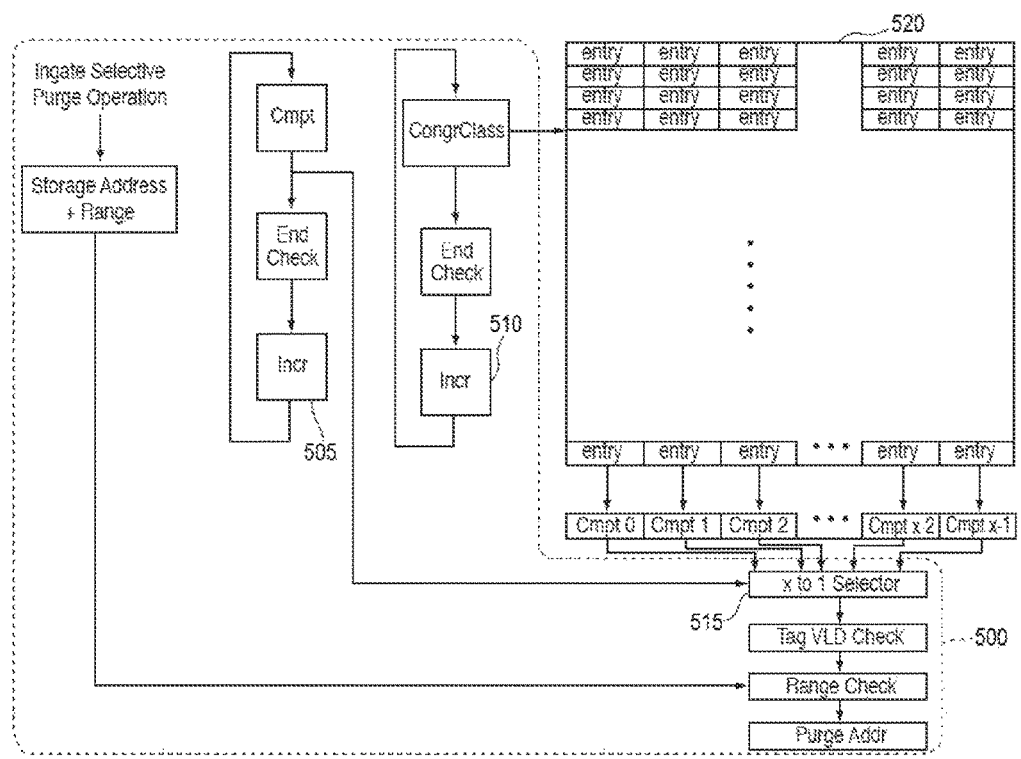
FIG. 5 depicts additional details of cache purge logic, in accordance with an embodiment of the present invention.

FIG. 5 depicts additional details of cache purge logic 235 executing within the data processing environment of FIG. 1, in accordance with an embodiment of the present invention. As shown in FIG. 5, cache purge logic 235 comprises the following components: compartment incrementor 505, congruence class incrementor 510, and directory compartment selector 515 which selects a compartment corresponding to an entry of cache directory 520. When the system determines to purge entries in cache directory 520, cache purge logic 235 loads a starting storage address and a length of the storage address range to be purged, sets preset values for the congruence class and the compartment, accesses an entry in cache directory 520 based on the preset values, accesses cache directory 520 based on the preset value of the congruence class, and selects an entry in cache directory 520 based on the preset value of the compartment selected by directory compartment selector 515 and determines the validity of the entry accessed by examining an ownership tag of the entry via a Tag Validity Check. Cache purge logic 235 compares a line address of the entry with the starting storage address and a sum of the starting storage address and the length of the storage address range via a Range Check, and selectively purges the entry based on the comparison result. As shown in FIGS. 4 and 5, compartment incrementor 505 and congruence class incrementor 510 respectively increment the compartment value and the congruence class value until these values reach a maximum value, and end check is repeatedly performed in both decision 435 and 445 respectively via an End Check as shown in FIG. 5, prior to incrementing the values. In an embodiment, cache purge logic 235 purges the entry when it is determined that the line address is greater than the starting storage address and less than a sum of the starting storage address and the length of the storage address range.

Further, when it is determined that the line address is not a valid entry, when it is determined that the line address is less than the starting storage address, when it is determined that the line address is greater than the sum of the starting storage address entry and the length of the storage address range or after the purging of the entry has been completed, compartment incrementor 505 increments the preset value of the compartment by one when it is determined that the preset value is less than the maximum value and continuously repeats the accessing, determining, comparing, selectively purging of entries, and incrementing of the preset value of the compartment until the preset value of the compartment equals the maximum value (X−1). Then, upon reaching the maximum value (X−1) of the compartment, it is determined whether the preset value of the congruence class equals a maximum value (Y−1) and when the preset value of the congruence class is less than the maximum value (Y−1), congruence class incrementor 510 increments the preset value of the congruence class and continuously repeats the accessing, determining, comparing, selectively purging of entries and incrementing of the present value of the congruence class until the preset value of the congruence class is equal to the maximum value (Y−1).

In an embodiment, the number of directory accesses required to complete all the necessary purges is equal to the number of directory entries, i.e. Y congruence classes multiplied by X compartments, independent of the number of lines in the specified address range.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for purging an address range from a cache, the method comprising:
  quiescing, by a processor, a computing system;
  issuing a command to purge storage addresses from a cache to higher level memory, wherein:
    the command comprises a starting storage address, a range of storage addresses to be purged, an indication that the purge is a non-quiesce selective purge, and a multiplier, and
    the range of storage addresses to be purged is based on the multiplier;

responsive to each cache of the computing system activating the command, wherein activating the command comprises causing the storage addresses from the cache to be inaccessible to operations attempting to access the storage addresses from the cache, ending the quiesce of the computing system;

subsequent to ending the quiesce of the computing system, purging storage addresses from the cache, based on the command, to the higher level memory;

concurrent to purging the storage addresses from the cache, identifying an attempt to access a first storage address within the range of storage addresses to be purged from the cache;

responsive to the attempt, generating an invalid address response; and updating a configuration array with a location of the purged storage addresses within the higher level memory.

* * * * *